(No Model.)

R. T. BOND.
CYCLONE REFUGE.

No. 592,190. Patented Oct. 19, 1897.

WITNESSES:
Otto Spieth.
H. L. Reynolds.

INVENTOR
R. T. Bond.
BY
ATTORNEYS.

UNITED STATES PATENT OFFICE.

RICHARD T. BOND, OF ATOKA, INDIAN TERRITORY.

CYCLONE-REFUGE.

SPECIFICATION forming part of Letters Patent No. 592,190, dated October 19, 1897.

Application filed June 19, 1897. Serial No. 641,421. (No model.)

*To all whom it may concern:*

Be it known that I, RICHARD T. BOND, of Atoka, Choctaw Nation, Indian Territory, have invented a new and Improved Cyclone-Refuge, of which the following is a full, clear, and exact description.

My invention relates to improvements in that class of cyclone-refuges which consist of chambers beneath the surface of the ground.

The invention consists, essentially, of a sunken chamber or pit, having a vertical mast or post therein which extends a little above the surface of the ground, and of a cage or similar structure normally supported with the major part thereof above the surface of the ground and held by catches which may be released at will to allow the cage to descend within the chamber, leaving only its roof visible. It is also provided with means for elevating the cage and for regulating its descent.

Reference is to be had to the accompanying drawings, forming a part of this specification, in which similar characters of reference indicate corresponding parts in both views.

Figure 1:
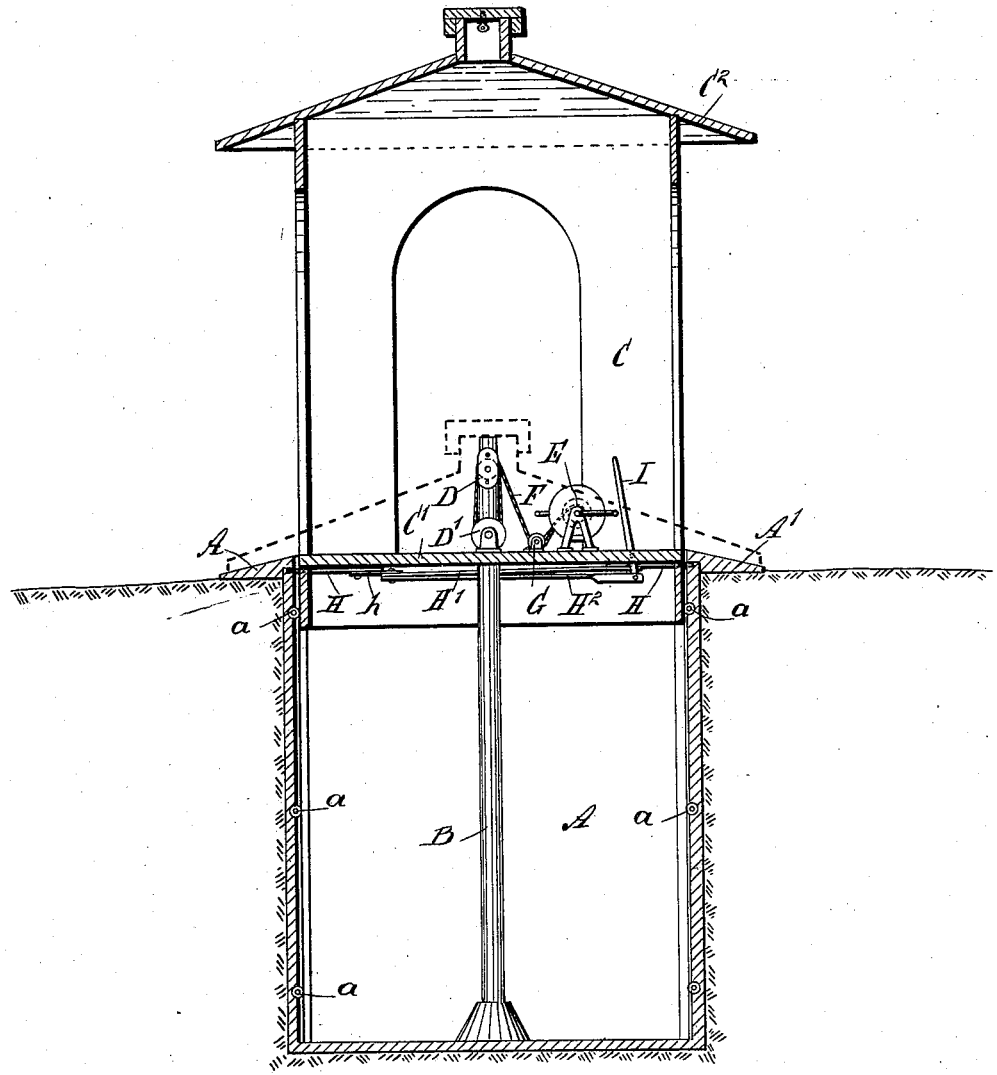
Figure 2:
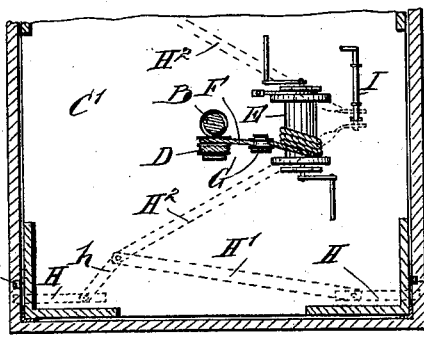

Figure 1 is a sectional elevation of the device, and Fig. 2 is a partial plan and section.

The chamber A has its walls formed of any suitable material, and is sunken beneath the surface of the ground. Preferably the chamber will be made of such material that it will be water-tight, thus preventing the chamber or pit from filling with water. A mast B is supported on the bottom of the pit and extends upward to a short distance above the level of the ground. Preferably the mast is located in the center of the pit, although if the device is constructed on a large scale it might be desirable to have more than one of these masts, which in such case would be otherwise located. The walls of the pit are preferably provided with a number of friction-rollers $a$, adapted to contact with the sides of the cage during its ascent and descent.

The cage C is constructed with a floor and roof, the sides thereof being made preferably rather open, so as to permit free access to its interior. It may, however, be made with its sides solid and provided with one or more doors, which may be closed. This, however, is an immaterial point, as the cage will when in use be depressed into the pit or chamber A. The floor $C'$ of the cage is provided with an opening to receive the mast B.

The mast B is provided with pulleys D, located upon one side thereof at its upper end, the same being above the floor of the cage. A pulley $D'$ is also fastened to the floor of the cage. To the floor of the cage is also fastened a hoisting apparatus E, consisting of a winding-drum with suitable cranks attached thereto and dogs for holding the same. A cable F, leading from this hoisting-drum, is passed through a pulley G, attached to the floor of the cage, and then through the pulleys D and $D'$, and is then fastened to the upper end of the mast B. These pulleys may be multiplied as much as necessary to secure the proper relation between the weight and the power available for turning the drum. By means of this device, when the cage is at the bottom of the pit, it may be hoisted to the surface.

Beneath the floor of the cage are a series of catches or bars H, mounted to slide in guides and connected either directly or by means of the link $H'$ to levers $h$, which in turn are connected by links $H^2$ with a lever I, which extends above the floor of the cage. These catches or slides H are adapted to engage sockets or projections upon the walls of the pit A, thus holding the cage in its elevated position with only a small portion of its bottom within the pit. In this position the floor of the cage would be on a level with the sills $A'$, surrounding the upper edge of the pit. These sills $A'$ are preferably made sloping outward. The catches H may be operated to lock the cage in place when sunk within the pit, and thus prevent the possibility of its being sucked out by the force of the wind.

The roof $C^2$ of the cage is provided with overhanging eaves, which should be of the same angle as the top surface of the sills $A'$. The entire device should be so proportioned that when the cage has descended into the pit the eaves $C^2$ will be in close contact with the sills $A'$, as indicated by dotted lines in Fig. 1. In such case the wind will have no opportunity to get beneath the roof of the cage in order to blow it off. If the cage is made a close fit within the pit, it may be allowed to descend by simply pulling the catches and dropping it into the pit. Being a tight fit, the air beneath the cage will prevent sudden shock upon the bottom, but will check its rapid descent and bring it gradually to position at the bottom of the pit A. The cage may also be allowed to descend by using the hoisting apparatus E and the mechanism connected therewith.

The device herein shown and described may be made ornamental and used as a summer-house or for any other purpose. It should be placed near the main house or residence, so that in case of necessity the cage may be quickly entered and dropped into the pit. In this position the occupants will be perfectly safe from any effects of even the most violent tornado.

Having thus described my invention, I claim as new and desire to secure by Letters Patent—

1. A cyclone-refuge, comprising a sunken chamber or pit, a cage or similar structure having a roof and adapted to fit within said chamber, and catches adapted to support said cage with its major part above said chamber, substantially as described.

2. A cyclone-refuge, comprising a sunken chamber or pit, a cage or other structure having a roof and adapted to fit within said chamber, catches adapted to support said cage with its major part above said chamber, and a lever connected to said catches to simultaneously release them, substantially as described.

3. A cyclone-refuge, comprising a sunken chamber or pit, a cage or similar structure having a roof and adapted to fit within said chamber, catches adapted to support said cage with its major part above said chamber, and hoisting means for raising and lowering said cage, substantially as described.

4. A cyclone-refuge, comprising a sunken chamber or pit, a central mast rising from the bottom thereof, a cage or similar structure having a roof and adapted to fit within said chamber, the floor of the cage having a hole to receive the mast, a hoisting apparatus comprising a cable guide attached to the top of the mast, and winding apparatus attached to the floor of the cage, substantially as described.

5. A cyclone-refuge, comprising a sunken chamber or pit having outwardly-sloping sills about its upper edge, a cage adapted to fit within said chamber and having a roof with projecting cornices adapted to fit closely to said sills, when dropped, and means for lowering and hoisting said cage at will, substantially as described.

6. A cyclone-refuge, comprising a sunken chamber or pit having outwardly-sloping sills about its upper edge, a cage adapted to fit within said chamber and having a roof with projecting cornices adapted to fit closely to said sills, when dropped, means for lowering and hoisting said cage at will, and friction-rollers journaled in the side of the pit, substantially as described.

RICHARD T. BOND.

Witnesses:
   T. L. CHISHOLM,
   J. H. WILKINS.